United States Patent
Kobayashi et al.

(10) Patent No.: US 10,197,402 B2
(45) Date of Patent: Feb. 5, 2019

(54) TRAVEL DIRECTION INFORMATION OUTPUT APPARATUS, MAP MATCHING APPARATUS, TRAVEL DIRECTION INFORMATION OUTPUT METHOD, AND COMPUTER READABLE MEDIUM

(71) Applicant: Asahi Kasei Kabushiki Kaisha, Tokyo (JP)

(72) Inventors: Shiro Kobayashi, Tokyo (JP); Masahiro Konda, Tokyo (JP); Yuko Akagi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 73 days.

(21) Appl. No.: 15/187,954

(22) Filed: Jun. 21, 2016

(65) Prior Publication Data

US 2016/0298972 A1   Oct. 13, 2016

Related U.S. Application Data

(63) Continuation of application No. PCT/JP2014/084396, filed on Dec. 25, 2014.

(30) Foreign Application Priority Data

Jan. 14, 2014   (JP) .................. 2014-004383

(51) Int. Cl.
*G01C 21/26*   (2006.01)
*G01C 21/16*   (2006.01)
*G01C 21/30*   (2006.01)

(52) U.S. Cl.
CPC ............. *G01C 21/26* (2013.01); *G01C 21/16* (2013.01); *G01C 21/30* (2013.01)

(58) Field of Classification Search
CPC ........ G01C 21/26; G01C 21/16; G01C 21/30; G01C 21/3605; G01C 21/3614; G01C 21/367

(Continued)

(56) References Cited

U.S. PATENT DOCUMENTS

| 5,483,456 A | * | 1/1996 | Kuwahara | ............... G01C 21/30 340/990 |
| 8,498,813 B2 | * | 7/2013 | Oohashi | .................. G01S 19/49 701/409 |

(Continued)

FOREIGN PATENT DOCUMENTS

| JP | 2009-075036 A | 4/2009 |
| JP | 2011-149923 A | 8/2011 |

(Continued)

OTHER PUBLICATIONS

International Search Report dated Mar. 24, 2015 for International Application No. PCT/JP2014/084396.

(Continued)

*Primary Examiner* — Jaime Figueroa
(74) *Attorney, Agent, or Firm* — Morgan, Lewis & Bockius LLP

(57) ABSTRACT

To estimate an accurate travel direction of a user based on sensor signals from a mobile device being held by the user even if the user moves ahead while moving the mobile device right and left, a travel direction information output apparatus, a travel direction information output method, and a computer readable medium are provided, the travel direction information output apparatus including a travel direction estimation unit that calculates a travel direction of the user, a rotation amount calculation unit that calculates rotation amounts about a gravity axis of the mobile device being held by the user, and a selection unit that selects, based on an integrated value of the rotation amounts, from either (Continued)

to output travel direction information according to the travel direction calculated by the travel direction estimation unit or to output travel direction information that keeps previous travel direction information output.

24 Claims, 7 Drawing Sheets

(58) Field of Classification Search
USPC .................. 701/1, 450, 36, 300, 487, 469
See application file for complete search history.

(56) References Cited

U.S. PATENT DOCUMENTS

| | | | |
|---|---|---|---|
| 9,667,615 B2* | 5/2017 | Ando | H04L 63/0823 |
| 2013/0132019 A1* | 5/2013 | Suzuno | G01C 21/32 |
| | | | 702/94 |
| 2013/0245935 A1* | 9/2013 | Matsuda | G01C 21/26 |
| | | | 701/487 |
| 2014/0108787 A1* | 4/2014 | Ando | H04L 63/0823 |
| | | | 713/156 |
| 2015/0354967 A1* | 12/2015 | Matsushita | G01C 21/16 |
| | | | 702/150 |
| 2016/0095539 A1* | 4/2016 | Kim | G01P 3/00 |
| | | | 702/19 |
| 2016/0146610 A1* | 5/2016 | Sato | G01C 21/16 |
| | | | 701/500 |
| 2016/0192863 A1* | 7/2016 | Zhong | A61B 5/112 |
| | | | 600/595 |

FOREIGN PATENT DOCUMENTS

| | | |
|---|---|---|
| JP | 2011-214832 A | 10/2011 |
| JP | 2012-145457 A | 8/2012 |
| JP | 2013-152165 A | 8/2013 |

OTHER PUBLICATIONS

International Preliminary Report on Patentability dated Jul. 28, 2016 for International Application No. PCT/JP2014/084396.

* cited by examiner

TRAVEL DIRECTION INFORMATION OUTPUT APPARATUS, MAP MATCHING APPARATUS, TRAVEL DIRECTION INFORMATION OUTPUT METHOD, AND COMPUTER READABLE MEDIUM

The contents of the following Japanese and PCT patent application(s) are incorporated herein by reference:
No. 2014-004383 filed on Jan. 14, 2014, and
No. PCT/JP2014/084396 filed on Dec. 25, 2014

BACKGROUND

1. Technical Field

The present invention relates to a travel direction information output apparatus, a map matching apparatus, a travel direction information output method, and a computer readable medium.

2. Related Art

A travel direction estimation apparatus, that estimates a travel direction of a user who holds a mobile device or the like according to an output of sensors or the like mounted in the mobile device, has been conventionally known (refer to, for example, Patent Document 1). Such a travel direction estimation apparatus that estimates the travel direction of the user has been widely used in mobile navigation.

Prior Art Document

Patent Document 1: Japanese Patent Application Publication No. 2012-145457

A user who uses mobile navigation often walks while looking around without changing a travel direction to look for a target object. A mobile terminal being held by the user is also deflected rightward and leftward according to this user operation to look around, and thus there is a problem with the travel direction estimation apparatus disclosed in Citation 1 that erroneously determines the user operation to look around without changing the travel direction as a change in the travel direction of the user. Furthermore, if a position of the user is estimated by applying map matching or the like while it is uncertain whether the user has changed the travel direction, there are cases in which a wrong street was selected as a street where the user travels, thereby causing a larger error in an estimated position.

SUMMARY

Therefore, it is an object of an aspect of the innovations herein to provide a travel direction information output apparatus, a map matching apparatus, a travel direction information output method, and a computer readable medium which are capable of overcoming the above drawbacks accompanying the related art. The above and other objects can be achieved by combinations described in the claims. A first aspect of the innovations may include a travel direction information output apparatus, a travel direction information output method, and a computer readable medium, the travel direction information output apparatus including a travel direction estimation unit that calculates a travel direction of a user, a rotation amount calculation unit that calculates rotation amounts about a gravity axis of a mobile device being held by the user; and a selection unit that selects, based on an integrated value of the rotation amounts, from either to output travel direction information according to the travel direction calculated by the travel direction estimation unit or to output travel direction information that keeps previous travel direction information output.

A second aspect of the innovations may include a map matching apparatus; which is comprised of the travel direction information output apparatus, a storage unit that stores an initial position of a user and map information, and a position determining unit that determines a position of the user on a map based on a movement amount according to the travel direction information of the user, which is output from the travel direction information output apparatus, from the initial position.

A third aspect of the innovations may include a travel direction information output method, the travel direction information output method including estimating a travel direction of a user, and selecting from either to output travel direction information according to a calculated travel direction of the user or to output travel direction information that keeps previous travel direction information output based on whether or not a mobile device being held by the user is deflected moving back and forth in a direction parallel to the ground.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
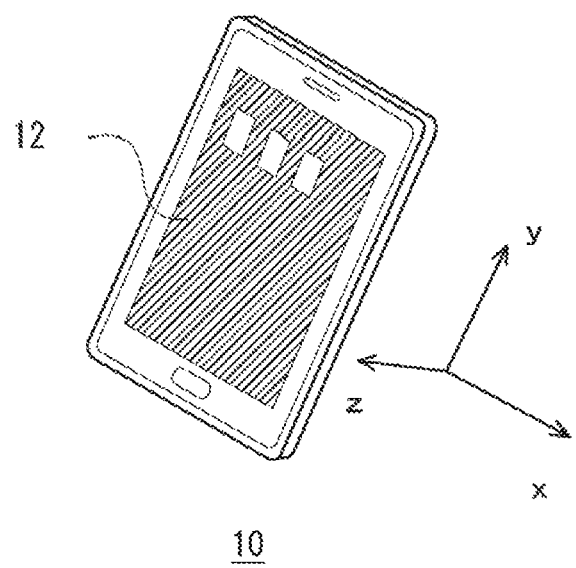
FIG. 1 shows an example of a mobile device 10 according to the present embodiment.

FIG. 1 shows an example of a mobile device 10 according to the present embodiment. The mobile device 10 has a plurality of sensors mounted therein, which detect the movement, holding style, position, and the like of this mobile device 10. The mobile device 10 is provided with an autonomous navigation system which displays a current position of the mobile device 10, a route from the current position to a destination, and the like according to an output of the sensors or the like mounted in the mobile device 10.

In addition, the mobile device 10 is further provided with a map matching function, and may serve as a map matching apparatus.

The mobile device 10 is provided with a communication function for connecting to an external apparatus, the Internet, or the like, and a data processing function or the like for executing a program, as an example. The mobile device 10 is a smartphone, a mobile phone, a tablet PC (Personal Computer), a mobile GPS (Global Positioning System) apparatus, or a miniature PC, or the like, for example. The mobile device 10 is provided with a display unit 12.

The display unit 12 displays a screen to operate Internet web pages, electronic mail, map, or documents, audio, video and images, or the like according to instructions from a user, for example. Moreover, the display unit 12 is a touch panel display into which user instructions are input, for example, and the user instructions are input to a manipulation screen of software such as a browser by touch input from the user. Alternatively, the user instructions may be input to the mobile device 10 through gesture input. Alternatively, the user instructions may be input to the mobile device 10 through an input device such as a keyboard, mouse, and/or joystick, or the like.

Here, an example of the mobile device 10 according to the present embodiment is explained, in which a surface parallel to a display surface of the display unit 12 is being an xy-plane surface, and a direction perpendicular to the display surface is being a z-axis. Moreover, an example of the mobile device 10 according to the present embodiment is explained, in which the display unit 12 has a vertically long rectangular shape. Furthermore, among two pairs of sides facing each other in the rectangle, a direction along shorter sides (transverse direction) is being an x-axis, and a direction along longer sides (longitudinal direction) is being a y-axis.

That is, an example is explained, in which, when the user views the display unit 12 while holding the mobile device 10 in hand, the horizontal direction is substantially parallel to the x-axis, and the vertical direction in which the user is standing (that is, gravity direction) is substantially parallel to a yz-plane. In this case, when the user uses the mobile device 10 as a telephone and puts the mobile device 10 to the user's ear to talk, a travel direction the user is facing is substantially parallel with the xy-plane, and a plane perpendicular to the travel direction is substantially parallel with the z-axis.

Such a mobile device 10 of the present embodiment displays, on the display unit 12, positional information of the user who holds the mobile device 10 using a plurality of positioning methods and systems. When signals from a plurality of GPS satellites can be received, for example, the mobile device 10 displays the positional information of the user using GPS function. Moreover, when signals from a plurality of GPS satellites cannot be received, the mobile device 10 may switch from GPS to the autonomous navigation system, and use the positional information acquired from the GPS as an initial position of the user, and continue the estimation of positional information of the user to display.

Alternatively, the mobile device 10 may start the autonomous navigation system responding to an input of the user. In this case, the mobile device 10 may also acquire information of the initial position of the user by the input of the user. Moreover, the mobile device 10 may execute map matching, and display the positional information of the user together with map information.

There are cases in which, when the user walks while holding such a mobile device 10, the mobile device 10 moves in a direction different from the travel direction of the user. There are cases in which, for example, when the user walks while checking a map displayed on the display unit 12, or when the user walks through a shopping street or the like lined on both sides with stores while looking at goods, the user moves ahead while shifting the position of the mobile device 10 rightward and leftward. Moreover, when the user walks in a zig-zag, the position of the mobile device 10 will move toward the travel direction as well as move toward the right-and-left direction relative to the travel direction.

In this way, if the travel direction of the mobile device 10 is estimated based on sensor signals from the mobile device 10 moving in a direction different from the travel direction, the travel direction will change every moment depending on the direction of the mobile device 10. That is, the travel direction changes one after another in a direction different from the travel direction of the user, and thus estimation accuracy decreases, thereby causing an error from the true current position.

Moreover, if the mobile device 10 executes the map matching function, the function determines a street where the user is walking according to an estimated travel direction, and thus there are cases in which an estimation error of the current position of the user further increases. Therefore, the mobile device 10 of the present embodiment is provided with a travel direction information output apparatus that prevents a decrease in estimation accuracy of the travel direction, even if the mobile device 10 changes the direction into a direction different from the travel direction.

Figure 2:
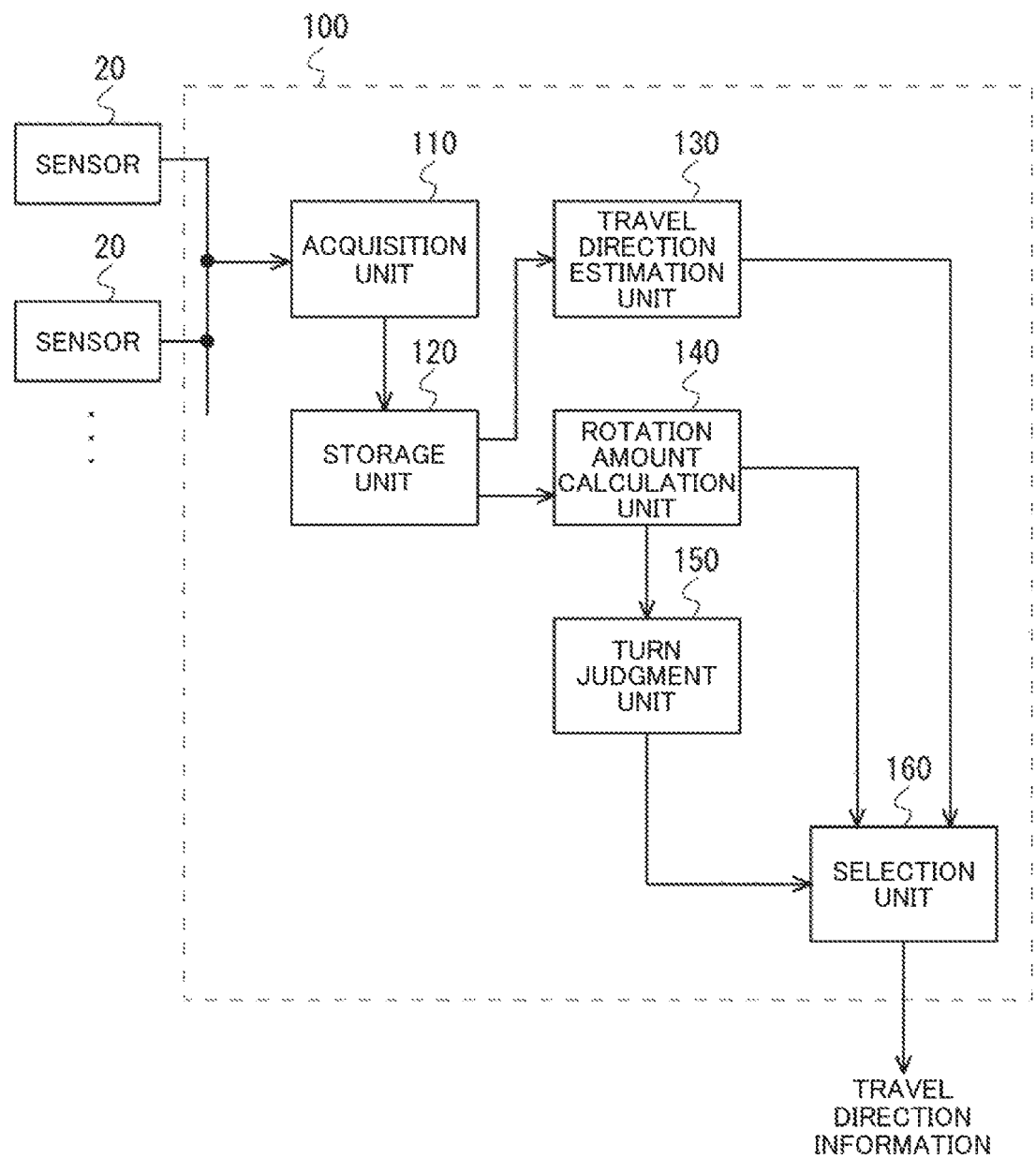
FIG. 2 shows an exemplary configuration of a travel direction information output apparatus 100 together with sensors 20 according to the present embodiment.

FIG. 2 shows an exemplary configuration of the travel direction information output apparatus 100 together with sensors 20 according to the present embodiment. Each sensor 20 may include at least one of angular velocity sensors, accelerometers, and geomagnetic sensors mounted in the mobile device 10, or a combination thereof. Each sensor 20 outputs a detection result of acceleration, angular velocity, and/or geomagnetism relative to at least two axes of the three xyz-axes (x-axis, y-axis, and z-axis) of an orthogonal coordinate system with its origin at the mobile device having the sensors mounted thereon, for example.

The travel direction information output apparatus 100 outputs travel direction information according to the travel direction of the user who holds the mobile device 10. The travel direction information output apparatus 100 is provided with an acquisition unit 110, a storage unit 120, a travel direction estimation unit 130, a rotation amount calculation unit 140, a turn judgment unit 150, and a selection unit 160.

The acquisition unit 110 is connected to a plurality of the sensors 20 and acquires sensor signals from the sensors 20. The acquisition unit 110 acquires the sensor signals from the sensors 20 according to a movement state of the user such as movement and stillness of the mobile device 10. The acquisition unit 110 acquires, from the sensors 20, the sensor signals according to the movement of the mobile device 10 accompanied by walking of the user, when the user walks while carrying the mobile device 10, as an example. The acquisition unit 110 stores the acquired sensor signals in the storage unit 120.

The storage unit 120 is connected to the acquisition unit 110, and stores the sensor signals received from the acquisition unit 110. The storage unit 120 provides requesters, such as the travel direction estimation unit 130 and the rotation amount calculation unit 140, upon request with the stored sensor signals from each unit, for example.

The travel direction estimation unit 130 estimates the travel direction of the user. The travel direction estimation unit 130 is connected to the storage unit 120, inputs the sensor signals from the sensors 20 equipped with the mobile device 10, and estimates the travel direction of the user based on the sensor signals. The travel direction estimation unit 130 estimates the travel direction of the user by performing signal analysis or pattern matching or the like on the sensor signals to detect a pattern signal accompanied by walking of the user, and analyzing travel direction dependence of the pattern signal, for example. Such a method of estimating the travel direction of the user based on the sensor signals obtained when the user is walking is known in the autonomous navigation. The travel direction estimation unit 130 may estimate the travel direction of the user by a known travel direction estimating method used as the autonomous navigation in this way.

The rotation amount calculation unit 140 calculates a rotation amount about a gravity axis of the mobile device 10 being held by the user. The rotation amount calculation unit 140 is connected to the storage unit 120, inputs the sensor signals from the sensors 20 equipped with the mobile device 10, and calculates the rotation amount of the mobile device 10 in a gravity axis direction based on the sensor signals. The rotation amount calculation unit 140 calculates the rotation amount about the gravity axis by synthesizing a plurality of the sensor signals from the angular velocity sensors and/or the accelerometers and performing axis conversion, as an example.

Moreover, the rotation amount calculation unit 140 outputs an integrated amount in which the rotation amounts calculated during a predetermined computation period are integrated, as the rotation amount of the mobile device 10 in the computation period. Here, an example is explained, in which each rotation amount of the present embodiment has plus/minus sign according to its rotation direction, and the integrated amount is calculated to be zero when the mobile device 10 is rotated through the same angle in different directions. That is, the rotation amount calculation unit 140 calculates the rotation amount of the mobile device 10 within the computation period over which the integration was performed by integrating the rotation amounts of the mobile device 10 obtained from the sensor signals.

For example, when the user rotates the mobile device 10 by 40 degrees in a clockwise direction relative to the gravity axis direction and by 75 degrees in a counterclockwise direction relative to the gravity axis direction in the predetermined computation period, the rotation amount calculation unit 140 outputs 35 degrees obtained by integrating each rotation amount, as the rotation amount of the mobile device 10 in the computation period. Here, the counterclockwise rotation direction has been explained as a plus direction.

The turn judgment unit 150 is connected to the rotation amount calculation unit 140, and judges whether or not the user has changed the travel direction according to the rotation amount of the mobile device 10 in a predetermined period. The turn judgment unit 150 provides the selection unit 160 with a judged result.

The selection unit 160 is connected to the travel direction estimation unit 130 and the rotation amount calculation unit 140, and selects, based on an integrated value of the rotation amounts calculated by the rotation amount calculation unit 140, from either to output travel direction information according to the travel direction calculated by the travel direction estimation unit 130 or to output travel direction information that keeps previous travel direction information.

The selection unit 160 switches between methods of detecting a change in the travel direction of the user according to detection of when the user continues a walking operation while moving the mobile device 10 in the right-and-left direction, and other cases.

Moreover, the selection unit 160 is connected to the turn judgment unit 150, and selects an output of the travel direction information according to the travel direction estimated by the travel direction estimating direction 130, according to judgment, by the turn judgment unit 150, of a change in the travel direction of the user. The selection unit 160 outputs the selected travel direction information to the outside.

The travel direction information output apparatus 100 of the present embodiment given above selects from either to output a past estimation result of the travel direction estimation unit 130 or output an updated most recent estimation result of the travel direction estimation unit 130 according to a walking state of the user. An operation of the travel direction information output apparatus 100 will be described in FIG. 3.

Figure 3:
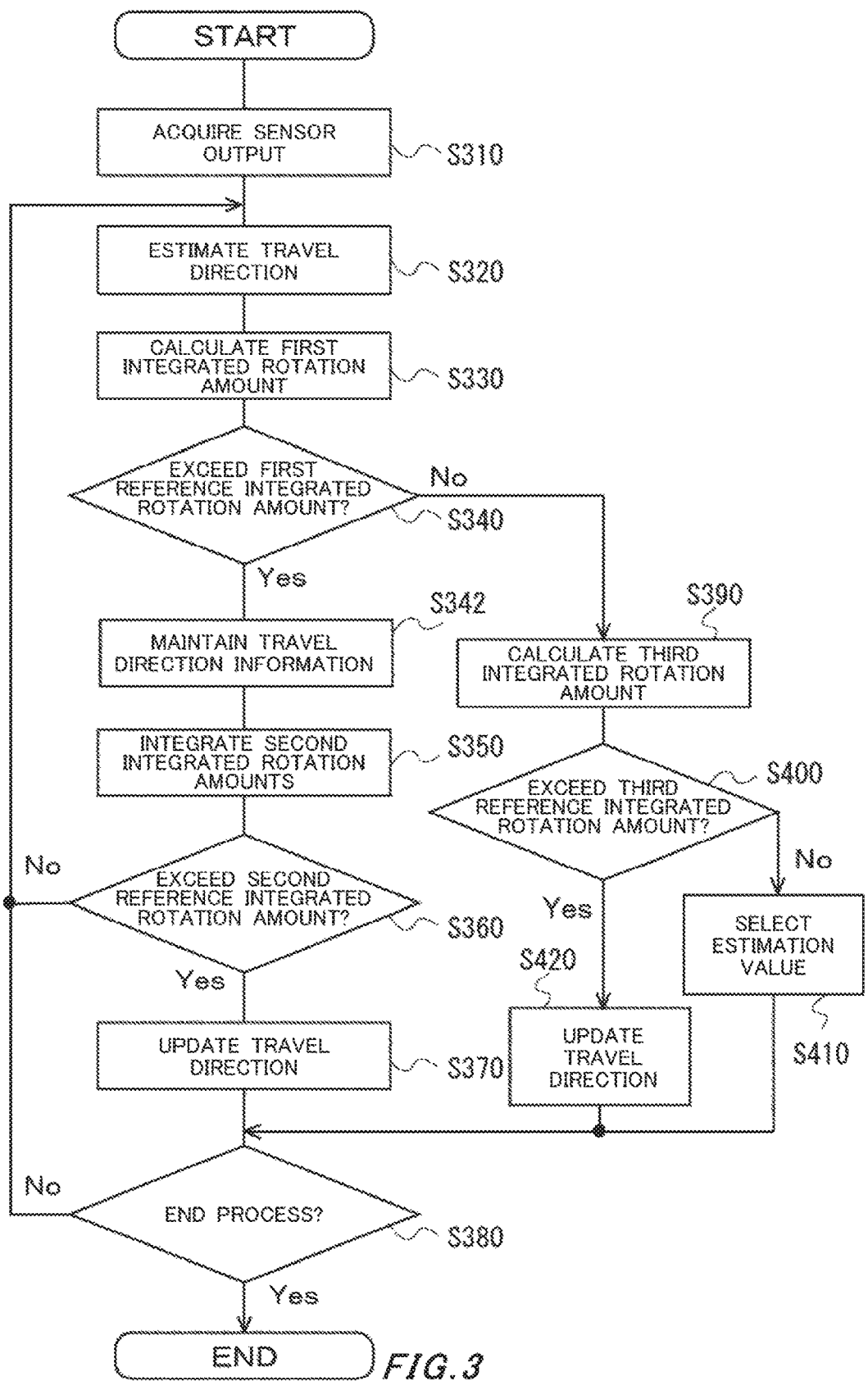
FIG. 3 shows an operational flow of the travel direction information output apparatus 100 according to the present embodiment.

FIG. 3 shows an operational flow of the travel direction information output apparatus 100 according to the present embodiment. The travel direction information output apparatus 100 outputs an estimation result of the travel direction of the user who carries the mobile device 10 by executing the operational flow shown in FIG. 3.

First, the acquisition unit 110 acquires an output from a plurality of the sensors 20 connected to the travel direction information output apparatus 100 (S310). The acquisition unit 110 stores the acquired sensor signals in the storage unit 120. The acquisition unit 110 may continuously execute acquisition of the sensor signals and storage of the sensor signals in the storage unit 120 in synchronization with an output timing of the sensor signals from the sensors 20. Alternatively, it may also continuously execute acquisition of the sensor signals and storage of the sensor signals in the storage unit 120 in a predetermined cycle.

Next, the travel direction estimation unit 130 estimates the travel direction of the user based on the sensor signals (S320). The travel direction estimation unit 130 may estimate the travel direction of the user from at least one sensor signal among the angular velocity sensors, the accelerometers, and the geomagnetic sensors, or a combination thereof. The travel direction estimation unit 130 may estimate the travel direction of the user by a known travel direction estimating method used as the autonomous navigation as disclosed in, for example, Patent Document 1.

Moreover, the travel direction estimation unit 130 may estimate the travel direction of the user based on the sensor signals from the sensors including the angular velocity sensors and/or the accelerometers, for example, and in this case, it estimates the travel direction of the user according to the change in the travel direction detected by each sensor. The travel direction estimation unit 130 accumulates changes from an initial value in the travel direction of the user, and estimates the travel direction of the user, as an example.

Moreover, the travel direction estimation unit 130 may estimate the travel direction of the user based on the sensor signals from the sensors including the geomagnetic sensors, for example, and in this case, it estimates the travel direction of the user using an absolute coordinate according to a difference from geomagnetism. The travel direction estimation unit 130 continuously executes estimation of the travel direction of the user in a predetermined timing, and provides the selection unit 160 with an estimation result.

Next, the rotation amount calculation unit 140 calculates an integrated value of the rotation amounts about the gravity axis during a predetermined first computation period $\Delta t_1$ as a first integrated rotation amount (S330). An example is explained, in which the rotation amount calculation unit 140 calculates the rotation amount about the gravity axis according to a plurality of the sensor signals from the accelerometers and the angular velocity sensors in the present embodiment.

Figure 4:
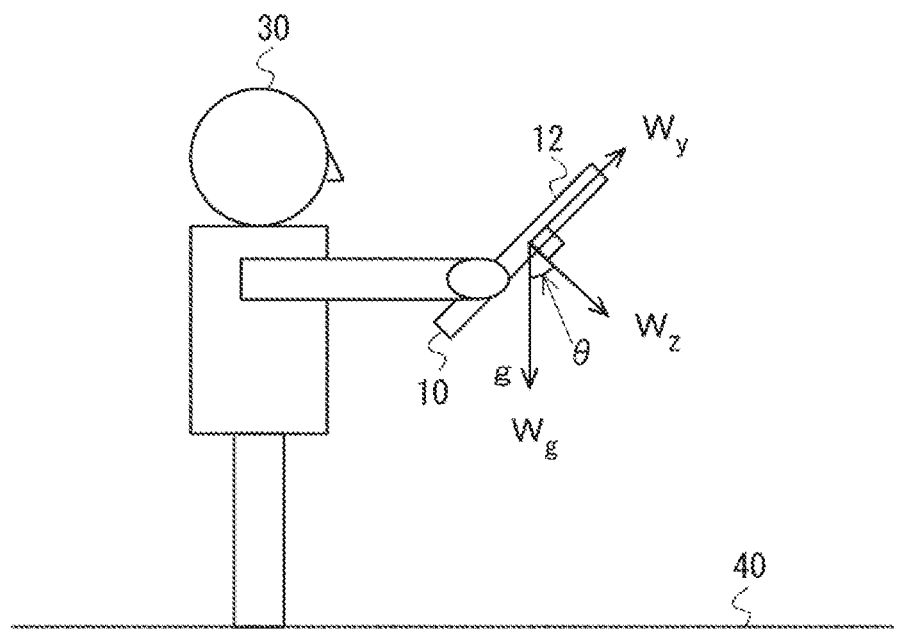
FIG. 4 shows an example of a user 30 who holds the mobile device 10 according to the present embodiment.

FIG. 4 shows an example of the user 30 who holds the mobile device 10 according to the present embodiment. FIG. 4 shows an example in which the user 30 who holds the mobile device 10 is walking on horizontal ground 40. FIG. 4 shows an example in which the gravity direction is shown as g, and the mobile device 10 forms angles of θ degree, θ+90 degrees, and 90 degrees with the z-axis, the y-axis, and the x-axis, respectively, relative to the gravity direction g.

The rotation amount calculation unit 140 calculates angles formed between the respective axes of the mobile device 10 and the gravity direction g based on a plurality of the accelerometer sensor signals, as an example. Here, gravitational acceleration is known as 1 G and thus it is possible to calculate the angles formed between the respective axes of the mobile device 10 and the gravity direction g from a degree of the 1 G acting on the xyz-axes of the mobile device 10. That is, the rotation amount calculation unit 140 can calculate the angle formation of θ degree, θ+90 degrees, and 90 degrees with the z-axis, the y-axis, and the x-axis of the mobile device 10, respectively, relative to the gravity direction g.

Moreover, the rotation amount calculation unit 140 calculates a rotation amount $W_g$ about the gravity axis based on the sensor signals from the angular velocity sensors corresponding to each axis of the xyz-axes of the mobile device 10. In the example of FIG. 4, the rotation amount calculation unit 140 can calculate the rotation amount $W_g$ about the gravity axis according to a rotation amount $W_y$ about a y-axis direction and a rotation amount $W_z$ about a z-axis direction, which are both obtained from the sensor signals, as shown in the expression given below.

$$W_g = W_y \sin\theta + W_z \cos\theta \quad \text{(Expression 1)}$$

Here, it is comparatively often the case that when the user 30 holds the mobile device 10, one axis of the xyz-axes is directed toward the vertical direction relative to the gravity direction g. For example, as shown in FIG. 4, when the user 30 views the display unit 12 of the mobile device 10, an x-axis direction is directed toward the substantially vertical direction relative to the gravity direction g. Moreover, when the user 30 views the display unit 12 while holding the mobile device 10 in a transverse direction, the y-axis direction is directed toward the substantially vertical direction relative to the gravity direction g. Moreover, when the user 30 puts the mobile device 10 to the user's ear to talk, the x-axis direction and the y-axis direction are directed toward the substantially vertical direction toward the gravity direction g.

In this way, if the user 30 holds the mobile device 10, at least one axis of the xyz-axes is directed toward the substantially vertical direction relative to the gravity direction g, and thus the sensor signals from the angular velocity sensors corresponding to the axis directed toward the vertical direction will contain almost no components calculated as the rotation amount $W_g$ about the gravity axis. For example, a rotation amount $W_x$ about the x-axis direction of FIG. 4 are not included in Expression 1.

Accordingly, the rotation amount calculation unit 140 may select two rotation amounts $W_{max}$ and $W_{2nd}$ of the largest and second-largest components of the gravity direction among the three sensor signals (rotation amounts) from the angular velocity sensors corresponding to the xyz-axes, and may calculate the rotation amount $W_g$ about the gravity axis using these rotation amounts $W_{max}$ and $W_{2nd}$. In this case, the rotation amount calculation unit 140 calculates the rotation amount $W_g$ about the gravity axis from the following expression.

$$W_g = W_{max} \sin\theta + W_{2nd} \cos\theta \quad \text{(Expression 2)}$$

The rotation amount calculation unit 140 selects two axes of the largest and second-largest average values of the sensor signals from the accelerometers respectively corresponding to the xyz-axes, as an example. Here, an average value of the sensor signals output from the angular velocity sensors becomes an offset value approximately representing gravity component acceleration. Therefore, the rotation amount calculation unit 140 selects two corresponding axes of the largest and second-largest average values of the sensor signals, and takes the two sensor signals (rotation amounts) from the angular velocity sensors about the axes as the rotation amounts $W_{max}$ and $W_{2nd}$.

The rotation amount calculation unit 140 may calculate the rotation amount $W_g$ about the gravity axis from the components of the two rotation amounts as mentioned above, when a difference occurs among the components of the gravity direction of the three rotation amounts of the angular velocity sensors respectively corresponding to the xyz-axes such that their order can be determined. The rotation amount calculation unit 140 calculates the rotation amount $W_g$ about the gravity axis using Expression 2, when a value of the smallest absolute value in the components of the gravity direction of the three output values of the angular velocity sensors is smaller than a predetermined value, as an example. Thereby, the rotation amount calculation unit 140 can calculate the rotation amount $W_g$ more easily and faster compared to the case of calculating the rotation amount $W_g$ about the gravity axis based on the three rotation amounts of the angular velocity sensors respectively corresponding to the xyz-axes.

Then, the rotation amount calculation unit 140 integrates a plurality of the rotation amounts $W_g$ about the gravity axis calculated during the predetermined first computation period $\Delta t_1$, and calculates the integrated amount as the first integrated rotation amount. Moreover, the rotation amount calculation unit 140 calculates the first integrated rotation amount at every first selection interval $\Delta it_1$.

Figure 5:
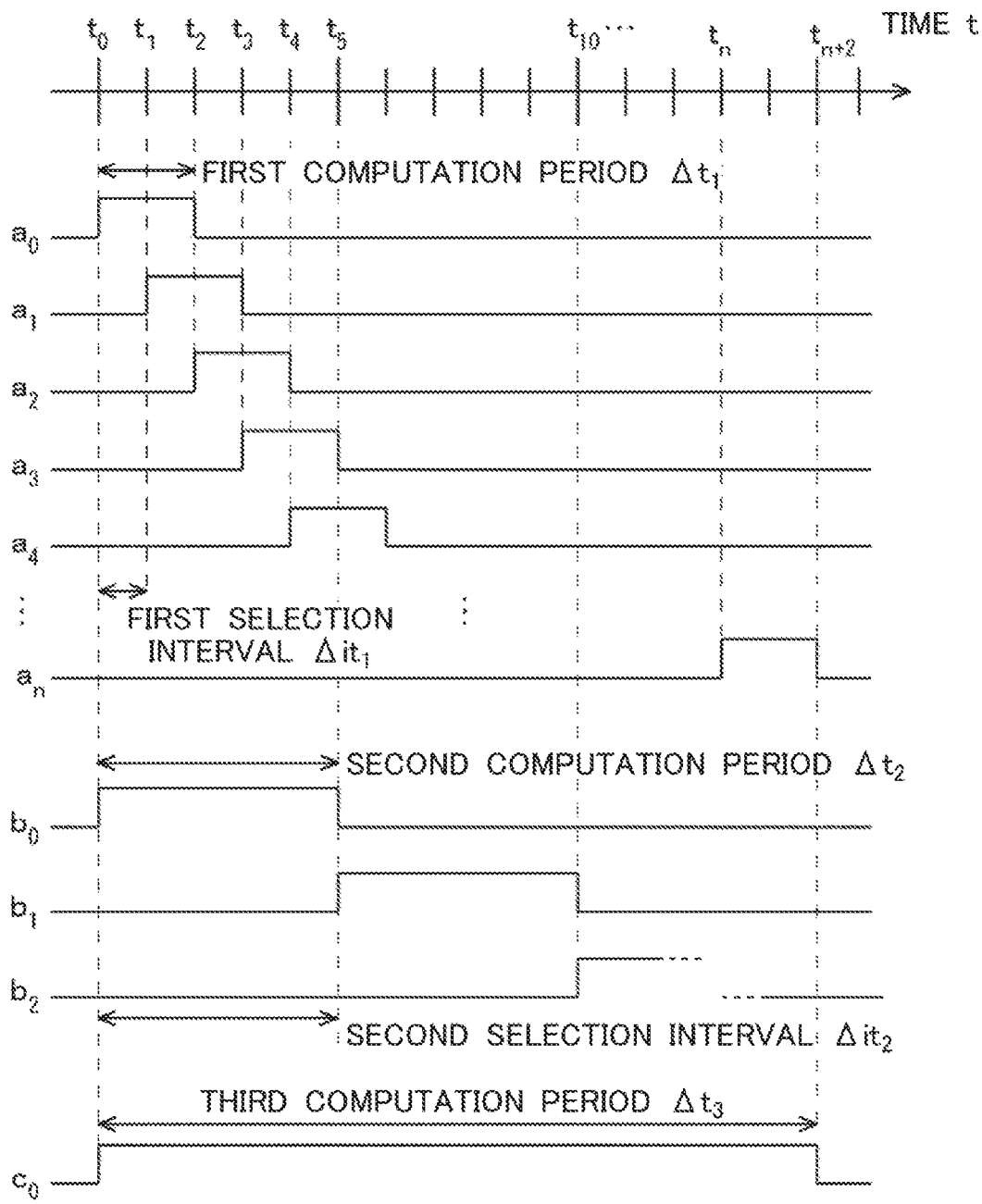
FIG. 5 shows an example of an operation according to a time axis of the travel direction information output apparatus 100 according to the present embodiment.

FIG. 5 shows an example of the operation according to a time axis of the travel direction information output apparatus 100 in accordance with the present embodiment. FIG. 5 shows waveforms schematically showing a process in which the rotation amount calculation unit 140 of the present embodiment integrates the rotation amounts $W_g$ about the gravity axis, taking the time axis as a horizontal axis. For example, waveform $a_0$ to waveform $a_n$ of FIG. 5 show that the rotation amount calculation unit 140 integrates the rotation amounts $W_g$ when the waveforms are in a high state, and does not integrate the rotation amounts $W_g$ when the waveforms are in a low state. That is, the rotation amount calculation unit 140 starts integration during the first computation period $\Delta t_1$ at time $t_0$, ends the integration at time $t_2$, and calculates the first integrated rotation amount (the waveform $a_0$).

Moreover, the rotation amount calculation unit 140 starts integration during the first computation period $\Delta t_1$ at time $t_1$, ends the integration at time $t_3$, and calculates the first integrated rotation amount (waveform $a_1$). In this way, the rotation amount calculation unit 140 sequentially calculates the first integrated rotation amount at every first selection interval $\Delta it_1$ (the waveform $a_0$ to the waveform $a_n$).

Here, the rotation amount calculation unit 140 may make the first selection interval $\Delta it_1$ a shorter period compared to the first computation period $\Delta t_1$. In this case, the rotation amount calculation unit 140 may execute calculation of a plurality of the first integrated rotation amounts in parallel, respectively. FIG. 5 shows an example in which the rotation amount calculation unit 140 makes the first selection interval $\Delta it_1$ substantially ½ of the first computation period $\Delta t_1$.

When the first integrated rotation amount during the predetermined first computation period $\Delta t_1$ exceeds a predetermined first reference integrated rotation amount (S340: Yes), the selection unit 160 selects to keep previous travel direction information output (S342). For example, when an integration result during the first computation period $\Delta t_1$ from the time $t_0$ to the time $t_2$ exceeds the first reference integrated rotation amount, the selection unit 160 keeps previous travel direction information output by the travel direction estimation unit 130 before the time $t_0$. Here, there are cases in which there is no significant difference in the integrated values of the rotation amounts between two cases where the user restlessly looked around (when the user moves ahead while moving the mobile device 10 in the right-and-left direction) in a period of time which is approximately the first computation period $\Delta t_1$ and where the user made a turn (to the right or left direction) in a period of time which is approximately the first computation period $\Delta t_1$, and it is difficult to distinguish whether the user restlessly looked around or the user made a turn. It is therefore desirable that the travel direction is not updated until it is confirmed by detection over a period of time longer than the first computation period $\Delta t_1$ whether the user restlessly looked around or the user made a turn.

Here, the first computation period $\Delta t_1$ may be approximately a period of time during which it takes for the user to take one step or more and substantially 10 steps or less. It is desirable that the first computation period $\Delta t_1$ is approximately a period of time during which it takes for the user to take substantially several steps. It is desirable to set the first computation period $\Delta t_1$ to be approximately a period of time during which it takes the user to take from one to six steps, for example, approximately 0.5 to 3.0 seconds. Furthermore, it is even more desirable to set the first computation period $\Delta t_1$ to be approximately a period of time during which it takes the user to take from two to four steps, for example, approximately 1.0 to 2.0 seconds. Moreover, the first computation period $\Delta t_1$ may be set according to the user. Moreover, a first reference angle may be an angle of 10 degrees or more, for example, approximately 20 degrees. Moreover, it is preferable that the first reference angle is an angle of approximately 30 degrees. Moreover, the first reference angle may be set according to the user.

That is, the selection unit 160 judges that the user started an operation to move ahead while moving the mobile device 10 in the right-and-left direction, when it is detected that the integrated value of the rotation amounts $W_g$ about the gravity axis is the first reference angle or more during the first computation period $\Delta t_1$ during which it takes the user to take approximately several steps, for example. Moreover, the selection unit 160 maintains the travel direction information output immediately before starting the operation as long a time as the user continues this operation, regarding there being a high possibility that the user just faces toward right and left relative to the travel direction and does not change the travel direction during this period. Then, the selection unit 160 outputs this travel direction information.

Next, the rotation amount calculation unit 140 starts integration of the rotation amounts about the gravity axis to calculate the rotation amount during a predetermined second computation period $\Delta t_2$ (S350). The rotation amount calculation unit 140 integrates the rotation amounts $W_g$ about the gravity axis during the second computation period $\Delta t_2$ at every second selection interval $\Delta it_2$, and calculates an integrated rotation amount. Here, it is assumed that the second computation period $\Delta t_2$ and the second selection interval $\Delta it_2$ are substantially the same computation period.

For example, waveform $b_0$ to waveform $b_2$ of FIG. 5 show that the rotation amount calculation unit 140 integrates the rotation amounts $W_g$ when the waveforms are in a high state, and does not integrate the rotation amounts $W_g$ when the waveforms are in a low state. In the case of the waveform $b_0$, the rotation amount calculation unit 140 integrates the rotation amounts $W_g$ from the time $t_0$ to time $t_5$, which is the end of the second computation period $\Delta t_2$, and outputs an integrated rotation amount $W_{g0}$ being an integration result as a second integrated rotation amount.

In the case of waveform $b_1$, the rotation amount calculation unit 140 starts integration during the second computation period $\Delta t_2$ at the time $t_5$, integrates the rotation amounts $W_g$ until time $t_{10}$, which is the end of the second computation period $\Delta t_2$, and calculates an integrated rotation amount $W_{g1}$. Then, an integrated rotation amount obtained by adding $W_{g0}$ and $W_{g1}$ is output as the second integrated rotation amount. In this way, the rotation amount calculation unit 140 calculates the integrated rotation amount by integrating the rotation amounts $W_g$ in the second computation period $\Delta t_2$ at every second selection interval $\Delta it_2$, and outputs the integrated rotation amount to which an integrated rotation amount calculated in the past is added as the second integrated rotation amount (the waveform $b_0$ to the waveform $b_2$).

In the above-mentioned example, the computation period from the time $t_0$ to the time $t_5$ is a second computation period $\Delta t_2$, and the rotation amount calculation unit 140 integrates the rotation amounts $W_g$ in the computation period which is twice as much as the second computation period $\Delta t_2$ (computation period from the time $t_0$ to the time $t_{10}$) at the waveform $b_1$ as a result, and outputs an integration result as the second integrated rotation amount. Alternatively, for example, assuming that the computation period from the time $t_0$ to the time $t_{10}$ is defined as the second computation period $\Delta t_2$, the rotation amount calculation unit 140 will output the integration result of the rotation amounts $W_g$ in the second computation period $\Delta t_2$ as the second integrated rotation amount, integrate the rotation amounts during the second computation period $\Delta t_2$ at every second selection interval $\Delta it_2$ (which is substantially equivalent to the second computation period $\Delta t_2$), add the integration result to the second integrated rotation amount calculated at the previous timing, and then output the obtained value as a new second integrated rotation amount.

Here, the rotation amount calculation unit 140 makes the second computation period $\Delta t_2$ a longer period compared to the first computation period $\Delta t_1$. That is, in the process in which the rotation amount calculation unit 140 integrates the second integrated rotation amounts, the rotation amount calculation unit 140 will execute calculation of a plurality of the first integrated rotation amounts in parallel. That is, judgment by a plurality of the first integrated rotation amounts will be executed while the rotation amount calculation unit 140 integrates the second integrated rotation amounts, and thus the rotation amount calculation unit 140 will continue integration of the second integrated rotation amounts when a plurality of judgment results all exceeds the first reference integrated rotation amount. In this way, start time and end time of the first computation period $\Delta t_1$ corresponding to, among a plurality of the integrated values of the rotation amounts calculated at every first selection interval $\Delta it_1$, at least one integrated value of the rotation amounts are between the start time and the end time of the second computation period $\Delta t_2$.

In this way, the rotation amount calculation unit 140 judges that the user started the operation to move ahead while moving the mobile device 10 in the right-and-left direction according to the observation that the first integrated rotation amount exceeds the first reference integrated rotation amount, and starts integration of the second integrated rotation amounts. Moreover, the rotation amount calculation unit 140 may continue the integration of the second integrated rotation amounts until the operation ends.

Here, the rotation amount calculation unit 140 may output the second integrated rotation amount as zero when the time t is not sufficient for integration time of the second integrated rotation amounts. For example, when it is judged by a calculation result of the first integrated rotation amounts at the time $t_2$ that the user started the operation to move ahead while moving the mobile device 10 in the right-and-left direction, the integration time is insufficient to calculate the second integrated rotation amounts at time phases including the time $t_2$ and the time $t_3$, and thus the rotation amount calculation unit 140 may output the second integrated rotation amount as zero.

Next, the turn judgment unit 150 judges whether or not the second integrated rotation amount, which is an integrated value of the rotation amounts during the predetermined second computation period $\Delta t_2$, exceeds a predetermined second reference integrated rotation amount (S360). Here, when the second integrated rotation amount is less than the second reference integrated rotation amount, the turn judgment unit 150 judges that the user has not changed the travel direction, and the flow returns to an estimation step S320 of estimating the travel direction of the user by the travel direction estimation unit 130 (S360: No). The selection unit 160 selects an output of the travel direction information that keeps the previous travel direction information output, according to judgment by the turn judgment unit 150 that the travel direction of the user has not been changed. Here, the rotation amount calculation unit 140 sets the second integrated rotation amount to zero when the time t is not sufficient for the integration time of the second integrated rotation amounts, and thus the flow will also return to the estimation step S320 of estimating the travel direction of the user in this case as well.

Meanwhile, when the travel direction information already output by the travel direction estimation unit 130 is continued to be maintained (that is, when the integrated value of the rotation amounts during the first computation period $\Delta t_1$ exceeds the first reference integrated rotation amount), the turn judgment unit 150 judges that the user has changed the travel direction when the integrated value of the rotation amounts during the predetermined second computation period $\Delta t_2$ exceeds the predetermined second reference integrated rotation amount (S360: Yes). In this way, the turn judgment unit 150 judges that the user has changed the travel direction when a state in which the first integrated rotation amount exceeds the first reference integrated rotation amount continues over a period of time that is longer than a period of time during which the second integrated rotation amount can be calculated, and also when the calculated second integrated rotation amount exceeds the second reference integrated rotation amount. In this case, the travel direction information output apparatus 100 may not maintain the travel direction information until the first integrated rotation amount is less than the first reference integrated rotation amount next even if the first integrated rotation amount exceeds the first reference integrated rotation amount, regarding the change in the travel direction continuing. Here, due to the detection time of the second computation period $\Delta t_2$ taking a longer time compared to the detection time of the first computation period $\Delta t_1$, the integrated rotation amount is substantially zero when the user restlessly looked around (because no change is made to the travel direction), whereas the integrated rotation amount is integrated by an amount of the changed travel direction when the user made a turn. Therefore, it is possible to differentiate between these two situations. That is, the turn judgment unit 150 can judge, using the period of the second computation period $\Delta t_2$, whether the user restlessly looked around or the user made a turn, and when it is judged that the user made a turn, accurate progression and walk information can be output by reflecting the integrated rotation amount corresponding to an amount of change in the direction.

Even if the user continues the operation to move ahead while moving the mobile device 10 in the right-and-left direction, the turn judgment unit 150 can cancel the change in the travel direction according to the movement in the right-and-left direction by taking the sum of the rotation amounts $W_g$ about the gravity axis of the mobile device 10 during the second computation period $\Delta t_2$. Then, the turn judgment unit 150 can judge that the user has changed the travel direction when a difference occurs between the sum of the rotation amounts $W_g$ and the travel direction (that is, zero degree, for example).

Here, the second computation period $\Delta t_2$ may be a period of time which is approximately 1.5 times longer and 10 times shorter than the first computation period $\Delta t_1$. That is, it is desirable that the second computation period $\Delta t_2$ is a computation period corresponding to the number of steps in which the user proceeds to walk while facing toward the right-and-left direction so as to change the travel direction.

It is desirable to set the first computation period $\Delta t_1$ to be approximately a period of time during which one to six steps are taken, for example, approximately 0.5 to 3.0 seconds. Furthermore, it is even more preferable to set the first computation period $\Delta t_1$ to be approximately a period of time during which two to four steps are taken, for example, approximately 1.0 to 2.0 seconds.

It is desirable to set the second computation period $\Delta t_2$ to be approximately a period of time during which it takes for the user to take from three to 15 steps, for example, approximately 1.5 to 7.5 seconds. Furthermore, it is desirable to set the second computation period $\Delta t_2$ to be approximately a period of time during which it takes for the user to take from four to 10 steps, for example, approximately 2.0 to 5.0 seconds. Moreover, the second computation period $\Delta t_2$ may be set according to the user, similarly to the first computation period $\Delta t_1$.

Moreover, a second reference angle may be an angle of 10 degrees or more, for example, approximately 20 degrees. It is preferable that the first reference angle is an angle of approximately 30 degrees. The second reference angle may be an angle of substantially the same as the first reference angle. Moreover, the second reference angle may be set according to the user.

Moreover, the turn judgment unit 150 may judge the change in the travel direction of the user further on condition that the rotation directions of the rotation amounts during the first computation period $\Delta t_1$ included within the second computation period $\Delta t_2$ all face toward one direction. There are cases in which, when the user walks while facing toward the right-and-left direction to change the travel direction, the user gradually changes the travel direction.

Therefore, the turn judgment unit 150 judges that the user has changed the travel direction when a state in which the first integrated rotation amount exceeds the first reference integrated rotation amount continues, and also when positive and negative signs of the first integrated rotation amount are all identical, and also when the second integrated rotation amount exceeds the second reference integrated rotation amount. Thereby, the turn judgment unit 150 can detect the change in the direction of the user over a long period of time that is difficult to be detected.

The turn judgment unit 150 provides the selection unit 160 with a travel direction in which the second integrated rotation amount is added to the travel direction already output as the travel direction information which should be selected, when it judges the change in the travel direction of the user. In response to receiving from the turn judgment unit 150 the travel direction information which should be selected, the selection unit 160 outputs the travel direction information and updates the travel direction (S370).

Thereby, the travel direction information output apparatus 100 can cancel, by the integration, the estimation result to be estimated regardless of the travel direction, even if the user walks while facing toward the right-and-left direction and changes the travel direction. Moreover, the travel direction information output apparatus 100 can calculate more accurate travel direction information by adding, to the travel direction output immediately before the integration, the change in the travel direction that exceeds the second reference integrated rotation amount, and can output the calculated travel direction information.

Moreover, when the travel direction estimation unit 130 estimates the travel direction of the user by the absolute coordinate using the sensor signals from the sensors including the geomagnetic sensors, the turn judgment unit 150 may provide the selection unit 160 with a latest estimation result of the travel direction estimation unit 130 as the travel direction information which should be selected, alternatively.

The travel direction information output apparatus 100 ends the process of the autonomous navigation according to the input of the instructions to end the user process (S380: Yes). Moreover, the travel direction information output apparatus 100 may end the process of the autonomous navigation according to establishment of communications with the GPS satellite, or the like, and acquisition of current positional information. Moreover, the travel direction information output apparatus 100 continues the process by returning to the estimation step S320 of estimating the travel direction until the instructions to stop or quit the process are input (S380: No).

In this case, the selection unit 160 may sequentially execute selection of the travel direction information which should be output at every predetermined first selection interval $\Delta it_1$, in synchronization with the rotation amount calculation unit 140. Moreover, the selection unit 160 may make the first selection interval $\Delta it_1$ a shorter computation period compared to the first computation period $\Delta t_1$. That is, the selection unit 160 continues to keep the previous travel information output when the integrated value of the rotation amounts during the first computation period $\Delta t_1$ exceeds the first reference integrated rotation amount.

Moreover, the turn judgment unit 150 may judge whether or not the user has changed the travel direction at every predetermined second selection interval $\Delta it_2$ in synchronization with the rotation amount calculation unit 140, when the travel direction information already output by the travel direction estimation unit 130 is continued to be maintained (that is, when the integrated value of the rotation amounts during the first computation period $\Delta t_1$ exceeds the first reference integrated rotation amount).

In the above-mentioned description, a case has been explained, in which the first integrated rotation amount exceeds the predetermined first reference integrated rotation amount. Meanwhile, the selection unit 160 selects to output the travel direction information according to the travel direction estimated by the travel direction estimation unit 130 on condition that the integrated value of the rotation amounts during the first computation period $\Delta t_1$ is less than the first reference integrated rotation amount (S340: No).

That is, the selection unit 160 judges that the user does not move ahead while moving the mobile device 10 in the right-and-left direction or has ended the travel operation to move the mobile device 10 in the right-and-left direction, when the first integrated rotation amount, while the user walks approximately several steps, is less than the first reference angle. Moreover, when the selection unit 160 maintains the travel direction information output immediately before starting the operation, it stops maintenance of the information.

Moreover, the rotation amount calculation unit 140 calculates the integrated value of the rotation amounts about the gravity axis during a third computation period $\Delta t_3$ as a third integrated rotation amount (S390). The rotation amount calculation unit 140 integrates a plurality of the rotation amounts $W_g$ about the gravity axis calculated during the third computation period $\Delta t_3$ and calculates the integrated amount as the third integrated rotation amount.

The rotation amount calculation unit 140 takes, as the third computation period $\Delta t_3$, a period from which it is detected that the first integrated rotation amount exceeds the first reference integrated rotation amount until a different first integrated rotation amount becomes less than the first reference integrated rotation amount. That is, the rotation amount calculation unit 140 defines the third computation period $\Delta t_3$ according to the operation of the user. For example, as shown in waveform $c_0$ of FIG. 5, the rotation amount calculation unit 140 takes, as the third computation period $\Delta t_3$, a period between start time $t_0$ of the first computation period $\Delta t_1$ in which the first integrated rotation amount exceeds the first reference angle and end time $t_{n+2}$ of the first computation period $\Delta t_1$ in which the first integrated rotation amount is less than the first reference angle. The rotation amount calculation unit 140 integrates the rotation amounts $W_g$ in the period, and calculates the third integrated rotation amount. That is, the third computation period $\Delta t_3$ changes according to the operation of the user, and thus the time in which the third computation period $\Delta t_3$ ends and the time in which the second computation period $\Delta t_2$ ends may not match.

Next, the turn judgment unit 150 judges whether or not the third integrated rotation amount exceeds a predetermined third reference integrated rotation amount (S400). Here, the turn judgment unit 150 judges that the user has not changed the travel direction when the third integrated rotation amount is less than the third reference integrated rotation amount, and provides the selection unit 160 with a judgment result (S400: No). In response to receiving the judgment result, the selection unit 160 selects the latest estimation result by the travel direction estimation unit 130, and outputs the selected latest estimation result as the travel direction information of the user, as an example (S410). In addition, the third reference integrated rotation amount may be a different value from or the same value as the second reference integrated rotation amount.

Here, when the first integrated rotation amount is less than the first reference integrated rotation amount since the first measurement, the rotation amount calculation unit 140 may output the estimation result of the travel direction estimation unit 130 as it is. In this way, the travel direction information output apparatus 100 outputs the estimation result when it is judged that the user does not move ahead while moving the mobile device 10 in the right-and-left direction, regarding the estimation result of the travel direction estimation unit 130 as being reliable. Moreover, the travel direction information output apparatus 100 also outputs the estimation result when it is judged that the user ends the operation to move ahead while moving the mobile device 10 in the right-and-left direction, and also when the user has not changed the travel direction while continuing the operation, regarding the estimation result of the travel direction estimation unit 130 as being reliable.

Moreover, the turn judgment unit 150 further judges that the user has changed the travel direction; when, after having continued to keep the previous travel direction information output by the travel direction estimation unit 130 (S400: Yes), the integrated value of the rotation amounts during the first computation period $\Delta t_1$ becomes less than the first reference integrated rotation amount, and the integrated value of the rotation amounts during a time period, that is from a timepoint at which the integrated value of the rotation amounts during the first computation period $\Delta t_1$ exceeds the first reference integrated rotation amount from a state in which it is less than the first reference integrated rotation amount and another timepoint at which the integrated value of the rotation amounts during the first computation period $\Delta t_1$ becomes less than the first reference integrated rotation amount, exceeds the third reference integrated rotation amount. In this way, the turn judgment unit 150 can detect the change even if the user has changed the travel direction in the computation period that is longer than the second computation period $\Delta t_2$.

That is, when the user ended the operation to move ahead while moving the mobile device 10 in the right-and-left direction, the turn judgment unit 150 judges whether or not the user has changed the travel direction during a period of the continued operation according to a difference between the sum of the rotation amounts $W_g$ about the gravity axis in the period of the continued operation and the travel direction (that is, zero degree).

In this way, the turn judgment unit 150 can detect the change in the orientation of the user over a period that is longer than the second computation period $\Delta t_2$. Moreover, even if detection omission or the like occurs in turn detection by the second integrated rotation amount, the turn judgment unit 150 can also detect the change in the orientation of the user in the turn detection by the third integrated rotation amount.

The turn judgment unit 150 provides the selection unit 160 with a travel direction in which the third integrated rotation amount is added to the travel direction already output as the travel direction information which should be selected, when it judges the change in the travel direction of the user in the turn detection by the third integrated rotation amount. In response to receiving from the turn judgment unit 150 the travel direction information which should be selected, the selection unit 160 outputs the travel direction information and updates the travel direction (S420).

Moreover, alternatively, the turn judgment unit 150 may provide the selection unit 160 with the latest estimation result of the travel direction estimation unit 130 as the travel direction information which should be selected, when the travel direction estimation unit 130 estimates the travel direction of the user by the absolute coordinate using the sensor signals from the sensors including the geomagnetic sensors.

As mentioned above, the travel direction information output apparatus 100 of the present embodiment estimates the travel direction of the user, and selects, based on whether or not the mobile device 10 being held by the user is deflected moving back and forth in a direction parallel to the ground, from either to output the travel direction information according to the calculated travel direction of the user or to output the travel direction information which keeps the previous travel direction information. That is, according to the user moving ahead while moving the mobile device 10 in the right-and-left direction, the travel direction information output apparatus 100 suspends the estimation result of the travel direction estimation unit 130 and maintains the output of the estimation result before the operation. Thereby, the travel direction information output apparatus 100 can prevent an estimation error of the travel direction caused by immediately adopting the estimation result of the travel direction estimation unit 130 according to the operation in which the user faces toward the right-and-left direction.

Moreover, the travel direction information output apparatus 100 can judge the travel direction of the user accurately and estimate a route along which the user moves ahead, while canceling the movement of the right-and-left direction which is unrelated to the travel direction of the user, based on the rotation amounts about the gravity axis obtained by a plurality of different integration computation periods such as the first integrated rotation amount, the second integrated rotation amount, and the third integration rotation amount.

It has been explained that the rotation amount calculation unit 140 of the travel direction information output apparatus 100 of the present embodiment calculates the rotation amounts about the gravity axis based on the sensor signals from the angle velocity sensors acquired by the acquisition unit 110. Alternatively, the rotation amount calculation unit 140 may calculate the rotation amounts about the gravity axis based on the sensor signals from the geomagnetic sensors. The rotation amount calculation unit 140 may calculate the rotation amounts about the gravity axis based on the temporal change of each angle formed by each of the xyz-axes of the mobile device 10 and the geomagnetic direction.

Alternatively, the rotation amount calculation unit 140 may acquire the rotation amount from others. For example, the travel direction estimation unit 130 may secondarily calculate the rotation amounts about the gravity axis as well when it analyzes the sensor signals and executes estimation of the travel direction. In such a case, the rotation amount calculation unit 140 can improve processing speed by acquiring and integrating the rotation amounts about the gravity axis from the travel direction estimation unit 130.

Figure 6:
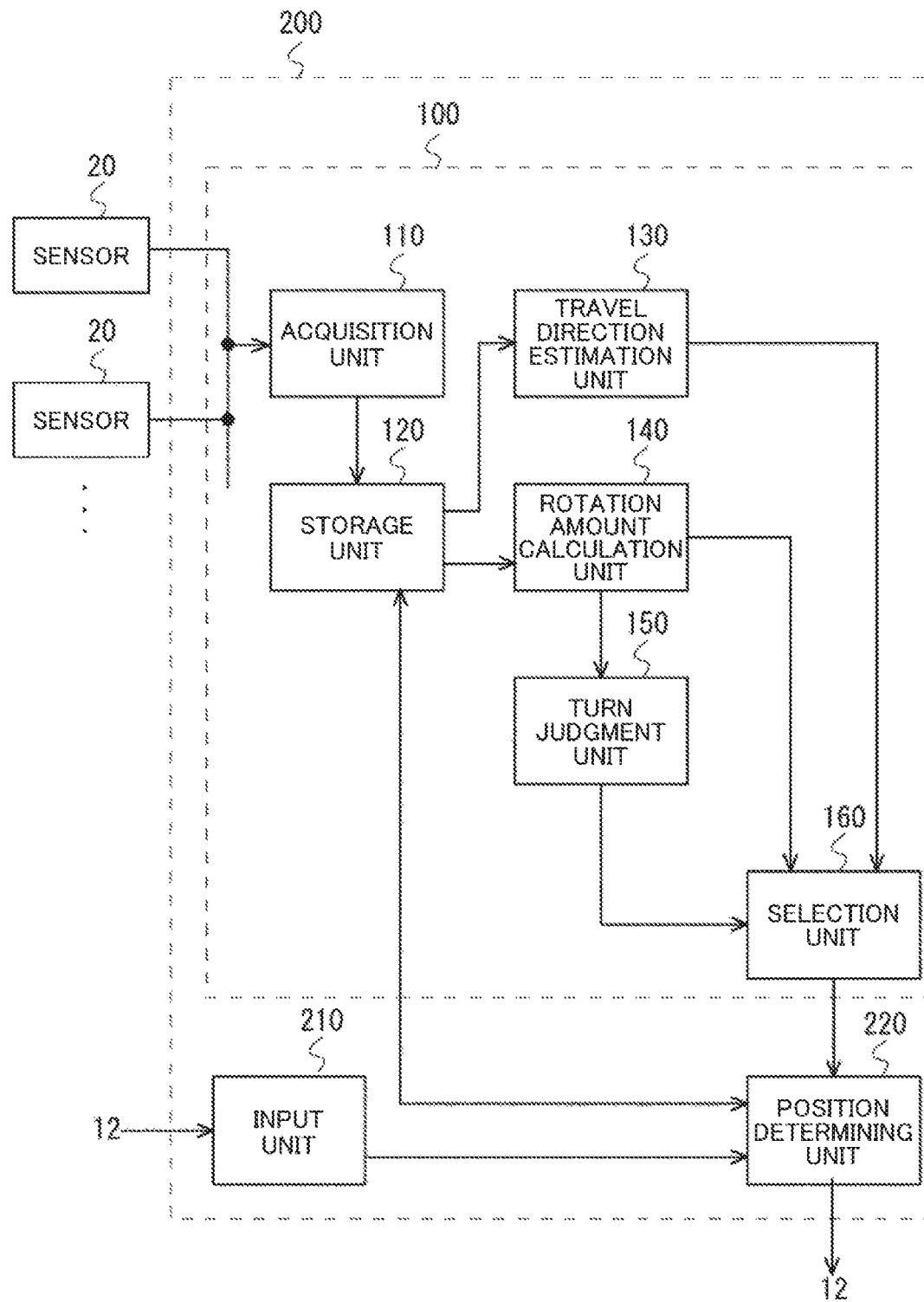
FIG. 6 shows an exemplary configuration of a map matching apparatus 200 according to the present embodiment.

As mentioned above, the travel direction information output apparatus 100 of the present embodiment can accurately judge the travel direction of the user, and thus it can estimate the position of the user on the map accurately even when it is applied to map matching. FIG. 6 shows an exemplary configuration of a map matching apparatus 200 according to the present embodiment. In the map matching apparatus 200 of the present embodiment, constitutional elements having operations which are substantially identical to those of the travel direction information output apparatus 100 according to the present embodiment shown in FIG. 2 are assigned the same reference numerals and explanations thereof will be omitted. The map matching apparatus 200 is further provided with an input unit 210 and a position determining unit 220.

The input unit 210 inputs an initial position of the user. Moreover, the input unit 210 may input instructions to start the process of a map matching function. The map matching apparatus 200 may input the initial position of the user and input start of the map matching function by displaying map information on the display unit 12 of the mobile device 10 and causing the user to designate the current position, as an example. In this case, the input unit 210 may be an input device such as a touch panel combined with the display unit 12, as an example.

The storage unit 120 stores map information to be displayed on the display unit 12. Moreover, the storage unit 120 may store the initial position of the user input from the input unit 210.

The position determining unit 220 determines the position of the user on the map based on a movement amount according to the travel direction information of the user from the initial position output from the travel direction information output apparatus 100. The travel direction information output apparatus 100 can output, as the travel direction information, the travel direction of the user where the error is reduced, and thus the position determining unit 220 can accurately determine the position of the user on the map.

Here, the map matching apparatus 200 may be further provided with a walk detecting section that detects a walking operation of the user. In this case, the position determining unit 220 may have the walk detecting section. For example, when the walk detecting section detects that the user is walking, it counts the number of pulses of periodic signals accompanied by walking, and also detects information about the number of steps taken by the user. Thereby, the position determining unit 220 can calculate the movement amount (the number of steps×stride) of the user using information of the number of steps taken by the user and information of the stride of the user. Here, the storage unit 120 may store information of the stride of the user in advance.

The position determining unit 220 displays the determined position of the user on the display unit 12 together with the map information. Thereby, the user can check the position of the user itself on the map even if the user moves the mobile device in the right-and-left direction regardless of the travel direction.

Figure 7:
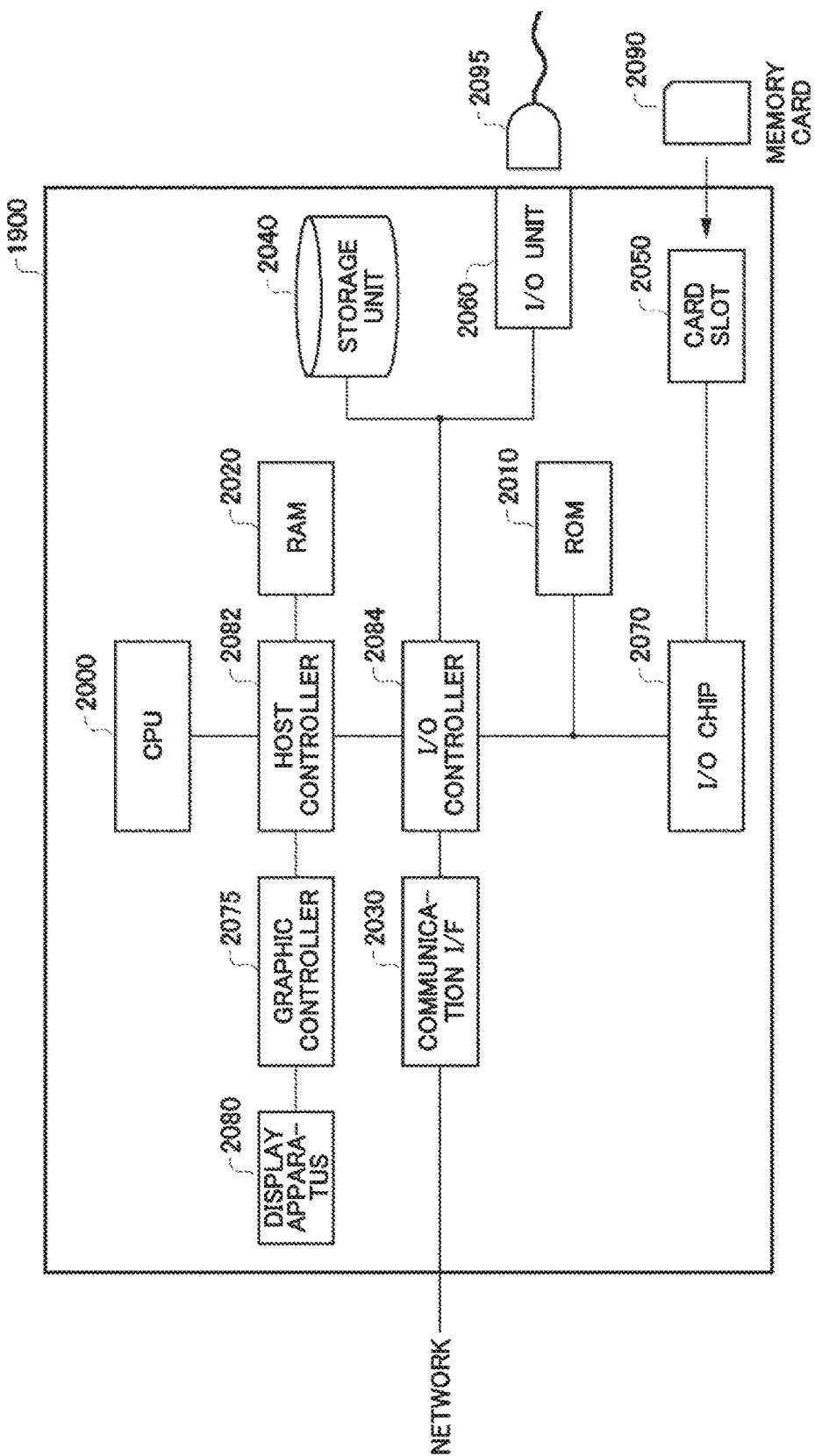
FIG. 7 shows an example of a hardware configuration of a computer 1900 serving as the travel direction information output apparatus 100 according to the present embodiment.

FIG. 7 shows an example of a hardware configuration of a computer 1900 functioning as the travel direction information output apparatus 100 according to the present embodiment. The computer 1900 according to the present embodiment is mounted in the mobile device 10, for example. Alternatively, the computer 1900 may be provided outside the mobile device 10, receive an output from the sensors of the mobile device 10, and transmit an output result or the like of the travel direction to the mobile device 10. In this case, the computer 1900 communicates wirelessly with the mobile device 10, as an example.

The computer 1900 according to the present embodiment is provided with a CPU peripheral including a CPU 2000, a RAM 2020, a graphic controller 2075, and a display apparatus 2080, all of which are mutually connected to each other by a host controller 2082; a communication interface 2030, a storage unit 2040, and an input/output unit 2060, all of which are connected to the host controller 2082 by an input/output controller 2084; a ROM 2010; a card slot 2050; and an input/output chip 2070.

The host controller 2082 is connected to the RAM 2020 and is also connected to the CPU 2000 and the graphic controller 2075 accessing the RAM 2020 at a high transfer rate. The CPU 2000 operates based on programs stored in the ROM 2010 and the RAM 2020, and perform control of each unit. The graphic controller 2075 acquires image data generated by the CPU 2000 or the like on a frame buffer disposed inside the RAM 2020 and displays the image data in the display apparatus 2080. Alternatively, the graphic controller 2075 may internally include the frame buffer storing the image data generated by the CPU 2000 or the like.

The input/output controller 2084 connects the communication interface 2030 serving as a relatively high velocity input/output apparatus, and the storage unit 2040, and the input/output unit 2060 to the host controller 2082. The communication interface 2030 communicates with other apparatuses via a network. The storage unit 2040 stores the programs and data used by the CPU 2000 housed in the computer 1900. The storage unit 2040 is a non-volatile memory and may be a flash memory, hard disk, or the like, for example.

The input/output unit 2060 is connected to a connector 2095, sends and receives programs or data to and from the outside, and provides the programs or data to the storage unit 2040 via the RAM 2020. The input/output unit 2060 may communicate with the outside using a standardized connector and communication method, and in this case the input/output unit 2060 may use a standard such as USB, IEEE 1394, HDMI (Registered Trademark), or Thunderbolt (Registered Trademark). The input/output unit 2060 may communicate with the outside using a wireless communication standard such as Bluetooth (Registered Trademark).

Furthermore, the input/output controller 2084 is connected to the ROM 2010, and is also connected to the card slot 2050 and the input/output chip 2070 serving as a relatively low velocity input/output apparatus. The ROM 2010 stores a boot program performed when the computer 1900 starts up, a program relying on the hardware of the computer 1900, and the like. The card slot 2050 reads programs or data from a memory card 2090 and provides the read information to the storage unit 2040 via the RAM 2020. The input/output chip 2070 connect the card slot 2050 to the input/output controller 2084 along with each of the input/output apparatuses via, a parallel port, a serial port, a keyboard port, a mouse port, or the like.

The programs to be provided to the storage unit 2040 via the RAM 2020 are provided by a user through the input/output unit 2060 or by being stored in a storage medium, such as the memory card 2090. The programs are read from storage medium, installed in the storage unit 2040 inside the computer 1900 via the RAM 2020, and executed by the CPU 2000.

The programs are installed in the computer 1900 and cause the computer 1900 to function as the acquisition unit 110, the storage unit 120, the travel direction estimation unit 130, the rotation amount calculation unit 140, the turn judgment unit 150, the selection unit 160, or the like.

The information processes recorded in the programs are read by the computer 1900 to cause the computer 1900 to function as the acquisition unit 110, the storage unit 120, the travel direction estimation unit 130, the rotation amount calculation unit 140, the turn judgment unit 150, the selection unit 160, or the like, which are all concrete means in which software and various types of hardware resources as mentioned above cooperate. With these specific means, a unique travel direction information output apparatus 100 suitable for an intended use can be configured by realizing the calculations or computations appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the RAM 2020, the storage unit 2040, the memory card 2090, or a transmission buffer region or the like provided to a storage apparatus connected via the input/output unit 2060, and send this transmission data to the network, or to write reception data received from the network onto a reception buffer region or the like on the storage apparatus. In this way, the communication interface 2030 may transmit data to and from the storage apparatus through DMA (Direct Memory Access), and alternatively, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like of all or a necessary portion of the database or files stored in the storage unit 2040, the memory card 2090, or the storage apparatus or the like connected via the input/output unit 2060. The CPU 2000 writes the processed data back to the external apparatus through DMA transmission or the like. In this process, the RAM 2020 is considered to be a unit that temporarily stores the content of the storage apparatus, and therefore the RAM 2020, the storage apparatus, and the like in the present embodiment are referred to as a memory, a storage unit, or a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine.

Moreover, the CPU 2000 can search for information stored in a file in the storage apparatus, the database, and the like. For example, if a plurality of entries associated respectively with a first type of value and a second type of value are stored in the storage apparatus, the CPU 2000 can search for entries fulfilling a condition designated by the first type of value from among the plurality of entries stored in the storage apparatus. The CPU 2000 can then obtain the second type of value associated with the first type of value fulfilling the predetermined condition by reading the second type of value stored at the same entry.

The programs and modules shown above may also be stored in an external storage medium. An optical storage medium such as a DVD, Blu-ray (Registered Trademark), or CD, a magneto-optical storage medium, a tape medium, a semiconductor memory such as an IC card, or the like can be used as the storage medium, other than the memory card 2090. Furthermore, a storage apparatus such as a hard disk or RAM that is provided with a server system connected to the Internet or a specialized communication network may be used to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A travel direction information output apparatus, comprising:
    a travel direction estimation unit configured to estimate travel direction of a user;
    a rotation amount calculation unit configured to calculate rotation amounts about a gravity axis of a mobile device being held by the user; and
    a selection unit configured to select, based on an integrated value of the rotation amounts, from either to output travel direction information according to the travel direction estimated by the travel direction estimation unit or to keep previous travel direction information output.

2. The travel direction information output apparatus according to claim 1, wherein the travel direction estimation unit takes sensor signals from sensors equipped with the mobile device, and estimates the travel direction of the user based on the sensor signals.

3. The travel direction information output apparatus according to claim 2, wherein the sensors include at least one of angular velocity sensors, accelerometers, and geomagnetic sensors.

4. The travel direction information output apparatus according to claim 1, wherein the selection unit selects to keep previous travel direction information output, and selects to output the travel direction information according to the travel direction estimated by the travel direction estimation unit when the integrated value of the rotation amounts during a first computation period is less than a first reference integrated rotation amount.

5. The travel direction information output apparatus according to claim 4, wherein the selection unit sequentially, at every predetermined first selection interval, executes selection of travel direction information to be output, and continues to keep the previous travel direction output when the integrated value of the rotation amounts during the first computation period exceeds the first reference integrated rotation amount.

6. The travel direction information output apparatus according to claim 5, wherein the selection unit has a shorter time for the first selection interval compared to the first computation period.

7. The travel direction information output apparatus according to claim 4, comprising a turn judgment unit configured to, when the integrated value of the rotation amounts during the first computation period exceeds the first reference integrated rotation amount, compare a predetermined second reference integrated rotation amount with the integrated value of the rotation amounts during a predetermined second computation period that is longer than the first computation period,
wherein the selection unit is configured to select, based on an output of the turn judgment unit, from either to output travel direction information according to the travel direction estimated by the travel direction estimation unit or to keep previous travel direction information output.

8. The travel direction information output apparatus according to claim 7, wherein the turn judgment unit judges that, when the integrated value of the rotation amounts during the first computation period exceeds the first reference integrated rotation amount, the user has changed the travel direction when the integrated value of the rotation amounts during the second computation period exceeds the second reference integrated rotation amount.

9. The travel direction information output apparatus according to claim 8, wherein the turn judgment unit judges a change in the travel direction of the user further when rotation directions of the rotation amounts during the first computation period included within the second computation period are unidirectional.

10. The travel direction information output apparatus according to claim 8, wherein the selection unit selects the output of the travel direction information according to the travel direction estimated by the travel direction estimation unit, when the turn judgment unit judges the change in the travel direction of the user.

11. The travel direction information output apparatus according to claim 8, wherein the turn judgment unit provides, when the turn judgment unit judges the change in the travel direction of the user, the selection unit with a travel direction in which the integrated value of the rotation amounts during the second computation period is added to the previous travel direction as the travel direction information which should be selected.

12. The travel direction information output apparatus according to claim 8, wherein the turn judgment unit judges whether or not the user has changed the travel direction at every predetermined second selection interval when the integrated value of the rotation amounts during the first computation period exceeds the first reference integrated rotation amount.

13. The travel direction information output apparatus according to claim 8, wherein the turn judgment unit further judges that the user has changed the travel direction; when, after having continued to keep the previous travel direction information output by the travel direction estimation unit, the integrated value of the rotation amounts during the first computation period becomes less than the first reference integrated rotation amount, and also when the integrated value of the rotation amounts during a time period, that is between a timepoint at which the integrated value of the rotation amounts during the first computation period exceeds the first reference integrated rotation amount and another timepoint at which the integrated value of the rotation amounts during the first computation period becomes less than the first reference integrated rotation amount, exceeds a third reference integrated rotation amount.

14. The travel direction information output apparatus according to claim 7, wherein the turn judgment unit judges that the user has not changed the travel direction on condition that the integrated value of the rotation amounts during the second computation period is less than the second reference integrated rotation amount, when the integrated value of the rotation amounts during the first computation period exceeds the first reference integrated rotation amount.

15. The travel direction information output apparatus according to claim 14, wherein the selection unit selects, according to the judgment by the turn judgment unit that the travel direction of the user has not been changed, the output of the travel direction information that keeps the previous travel direction information output.

16. The travel direction information output apparatus according to claim 7, wherein the first computation period is shorter than the second computation period; the selection unit sequentially executes selection of the travel direction information which should be output at every predetermined first selection interval; and start time and end time of the first computation period corresponding to, among a plurality of the integrated values of the rotation amounts calculated at every first selection interval, at least one integrated value of the rotation amounts are between the start time and the end time of the second computation period.

17. The travel direction information output apparatus according to claim 1, wherein the selection unit selects from either to output the travel direction information according to the travel direction estimated by the travel direction estimation unit or to keep the previous travel direction information output; based on the integrated value of the rotation amounts during a predetermined first computation period, and on the integrated value of the rotation amounts during a predetermined second computation period which is longer than the first computation period.

18. The travel direction information output apparatus according to claim 17, wherein the selection unit outputs the travel direction information that keeps the previous travel direction information output when the integrated value of the rotation amounts during the first computation period exceeds a first reference integrated rotation amount and also the integrated value of the rotation amounts during the second computation period is less than a second reference integrated rotation amount; and outputs the travel direction information according to the travel direction estimated by the travel direction estimation unit when the integrated value of the rotation amounts during the first computation period exceeds the first reference integrated rotation amount and the integrated value of the rotation amounts during the second computation period exceeds the second reference integrated rotation amount.

19. The travel direction information output apparatus according to claim 18, wherein the selection unit outputs, as the travel direction information according to the travel direction estimated by the travel direction estimation unit, the travel direction in which the integrated value of the rotation amounts during the second computation period is added to the previous travel direction output, when the integrated value of the rotation amounts during the first computation period exceeds the first reference integrated rotation amount and also the integrated value of the rotation amounts during the second computation period exceeds the second reference integrated rotation amount.

20. The travel direction information output apparatus according to claim 17, wherein the selection unit outputs the travel direction information according to the travel direction estimated by the travel direction estimation unit when the integrated value of the rotation amounts during the first computation period is less than a first reference integrated rotation amount.

21. The travel direction information output apparatus according to claim 17, wherein the selection unit sequentially executes selection of the travel direction information which should be output at every predetermined first selection interval, and start time and end time of the first computation period corresponding to, among a plurality of the integrated values of the rotation amounts calculated at every first selection interval, at least one integrated value of the rotation amounts are between the start time of the second computation period.

22. A non-transitory computer-readable medium storing thereon a program that, when executed by a computer, causes the computer to function as a travel direction information output apparatus to perform the following operations:
   estimating a travel direction of a user;
   calculating rotation amounts about a gravity axis of a mobile device being held by the user; and
   selecting, based on an integrated value of the rotation amounts, from either to output travel direction information according to the estimated travel direction or to keep previous travel direction information output.

23. A non-transitory computer-readable medium storing thereon a program that, when executed by a computer, causes the computer to function as a travel direction information output apparatus to perform the following operations:
   estimating a travel direction of a user; and
   selecting from either to output travel direction information according to the estimated travel direction of the user or to output travel direction information that keeps previous travel direction information, based on whether or not a mobile device being held by the user is deflected moving back and forth in a direction parallel to the ground.

24. The travel direction information output apparatus according to claim 1, further comprising:
   a storage unit configured to store an initial position of the user and map information; and
   wherein the travel direction information output apparatus is associated with a map matching apparatus and is communicatively connected to a position determining unit of the map matching apparatus, and
   wherein the position determining unit determines a position of the user on a map based on a movement amount according to the travel direction information of the user, which is output from the travel direction information output apparatus, from the initial position.

* * * * *